United States Patent [19]
Corbett

[11] Patent Number: 5,433,126
[45] Date of Patent: Jul. 18, 1995

[54] ROTARY CONTROLLED MOTION TRANSMISSION ASSEMBLY

[75] Inventor: Christopher H. Corbett, Bolivar, Ohio

[73] Assignee: Flex Technologies, Inc., Midvale, Ohio

[21] Appl. No.: 65,765

[22] Filed: May 24, 1993

[51] Int. Cl.⁶ ............................................. F16C 1/12
[52] U.S. Cl. ...................................... 74/501.6; 74/96
[58] Field of Search ............... 74/96, 107, 99 A, 108, 74/501.6, 569, 20, 56

[56] References Cited

U.S. PATENT DOCUMENTS

| | | | |
|---|---|---|---|
| 2,461,378 | 2/1949 | Grose | 74/501.6 |
| 2,787,169 | 4/1957 | Farr et al. | 74/501.6 |
| 3,208,300 | 9/1965 | Morse | 74/501.6 |

FOREIGN PATENT DOCUMENTS

195704  3/1923  United Kingdom ............... 74/501.6

Primary Examiner—Michael Koczo
Attorney, Agent, or Firm—Michael Sand Co.

[57] ABSTRACT

A rotary controlled motion transmission assembly is mounted behind the dashboard of a vehicle and has a knob that extends through the dashboard for rotary actuation by an occupant of the vehicle to move a bulkhead door for controlling the environment within the vehicle. The knob is connected to a cam plate having first and second ramps which rotate upon rotation of the knob. A pair of spring biased plungers, each having a camming surface, operatively engage respective ramps. A pair of cables are connected to the plungers and extend along a circuitous path within flexible conduits to a receiver assembly, such that axial translation of the plungers upon rotation of the control knob, results in axial translation of the cables. The cables are connected to a pulley mounted on a shaft which is connected to the bulkhead door for opening and closing of the door. When the knob is turned, the ramp surfaces move the plungers in opposing directions whereby the cables are moved in opposing directions thereby rotating the pulley within the receiver assembly, to move the bulkhead door.

16 Claims, 8 Drawing Sheets

ROTARY CONTROLLED MOTION TRANSMISSION ASSEMBLY

BACKGROUND OF THE INVENTION

1. Technical Field

The invention relates generally to a motion transmission assembly. Particularly, the invention relates to a motion transmission assembly of the type wherein motion is transmitted along a curved path by a flexible motion transmitting core element movably supported by a flexible conduit. Specifically, the invention relates to rotary actuated motion transmission assemblies which transfer motion along a cable which circuitously extends between a control knob, and an apparatus to be controlled, specifically, a bulkhead door in a vehicle.

2. Background Information

All types of vehicles having enclosed passenger compartments, including automobiles, trucks, vans and mini-vans, continue to grow in popularity with the number of these vehicles expected to increase in the future. Vehicle manufacturers, recognizing this ever growing market, are continually striving to improve their products. These improvements include on-board computers for regulating and monitoring engine performance, improved aerodynamic design for better fuel efficiency and appearance, and computers which calculate and display by LEDs on the dashboard everything from gas mileage to the preferred trip route. Despite such advances, manufacturers have been unable to satisfactorily solve the problem of forward firewall or bulkhead doors which improperly open and close upon manual adjustment of control levers for regulating the environment in the passenger compartment. Moreover, the need has recently arisen to replace the linearly moveable control lever with a rotary style control knob which further increased the system complexity.

Most vehicles have a control module mounted on the dashboard for regulating the temperature within the passenger compartment. Other functions such as venting and defrosting of the vehicle windows are also controlled by manual adjustment of the linearly moveable module levers. The levers are connected to the bulkhead doors via cables which are movably mounted for opening and closing apertures formed in the bulkhead.

For example, in many automobiles, one of the levers of the control module is moved to the "hot" position for opening a door on the bulkhead and permitting heat to be blown into the passenger compartment during cold weather. As the lever is moved linearly from the "cold" to the "hot" position, the cable extending between the lever and door is displaced in the direction of the lever, and the door is pulled to the open position. When the lever is returned to the "cold" position the cable is displaced in the direction of the door and the door is pushed to the closed position.

Problems occur because the levers do not provide a consistent feel to the passenger as the levers are often loose through a portion of their path of travel, and are more difficult to move at other portions along the path of travel. The difference in feel is created by ever changing loads along the path of travel. These load changes are created as the weight of the bulkhead door is increasingly and decreasingly carried by the cable.

Another problem that is consistently faced by automobile manufacturers is that most of the change in air flow occurs at the beginning and the end of the door's path of travel. The door movement between these two positions or in the center of the path of travel, only minimally affect the air flow. As such, the passenger operating the control lever must operate the lever for a significant distance to affect the air flowing into the passenger compartment.

It is for these and other reasons that the vehicle manufacturers have turned away from the use of manually operated levers to actuate the doors, and are beginning to use rotary actuated knobs to transfer the motion to the bulkhead door. However, the transmission of rotary input motion, along a circuitous path to a discreet output can only occur by use of a flexible shaft, which for the variety of paths needed on the market, is too costly; or by transferring the rotary motion into linear motion.

Heretofore, the transfer has been clumsy at best as the resistance on the knob has not remained constant through the entire knob rotation. Moreover, the knobs utilized in the prior art did not always remain in the desired position. Specifically, the knobs would be heavily loaded at certain positions within the stroke, which load would cause the knob to inadvertently and undesirably rotate, such rotation would then affect movement of the bulkhead door.

Attempts to solve such problems are well known in the art and primarily have focused on the use of electric motors to turn a cable or pulley to open and close the bulkhead doors. However, such motors are much more costly than manually operated motion transmission systems and are often as much as five times more costly. Moreover, the use of motors further burdens the engine and provides more components subject to breakdown.

Therefore, a need exists for a rotary controlled motion transmission assembly which transfers rotary input motion along a linear cable which extends along a circuitous path, and which will provide for a constant resistance on a control knob through the knob's entire radius of travel. Moreover, the need exists for such a rotary assembly which input knob will remain securely positioned at any point in the knobs radius of travel, and is not overloaded in either the clockwise or counterclockwise directions. Lastly, the need exists for an assembly which can accelerate the opening of the bulkhead door in that the arc of the radius of travel where little alteration to the air flow is experienced is such that each point along the radius of travel will create the same effective change in air flow into or out of the passenger compartment.

There is no assembly for the transmission of motion of which I am aware which can be quickly and easily installed on a vehicle in an assembly production line, which controls the operation of a bulkhead door along a circuitous path while the rotatable control knob has a constant resistance thereon, and which knob will not inadvertently rotate due to overloading by the position of the bulkhead door. Moreover, there is no known assembly of which I am aware where each radial incremental turn of the control knob creates the same effective change in air flow through the entire radius of travel.

SUMMARY OF THE INVENTION

Objectives of the invention include providing an assembly for transmitting motion from a rotary control knob to a bulkhead door.

A further objective includes providing such an assembly which provides for constant resistance on the rotary control knob through the knob's entire radius of travel.

Another objective is to provide such an assembly which provides for constant radial force on the knob in both the clockwise and counterclockwise directions.

A further object of the invention is to provide such an assembly where each incremental turn of the control knob will provide an incremental change in the effective air flow traveling through the bulkhead door.

Yet another objective is to provide such a rotary controlled motion transmission assembly which will operate equally well on most vehicles and bulkhead doors.

A still further objective is to provide such a rotary controlled motion transmission assembly which will accept rotary input, transfer the input into linear motion along a circuitous path, and then transfer the linear motion to rotary output.

A still further objective is to provide such a rotary controlled motion transmission assembly which is of a simple construction, which achieves the stated objectives in a simple, effective and inexpensive manner, and which solves problems and satisfies needs existing in the art.

These and other objectives and advantages of the invention are obtained by the improved rotary controlled motion transmission assembly comprising a housing; rotary control means associated with said housing for imputing a rotary force; force transfer means operatively associated with said rotary control means for accepting the input of the rotary force from the rotary control means and for transferring the rotary force into linear motion; receiver means for accepting the linear motion and creating rotary motion therefrom; and transmitting means extending from said housing to said receiver means for transmitting the linear motion of said force transfer means along a circuitous path to said receiver means.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
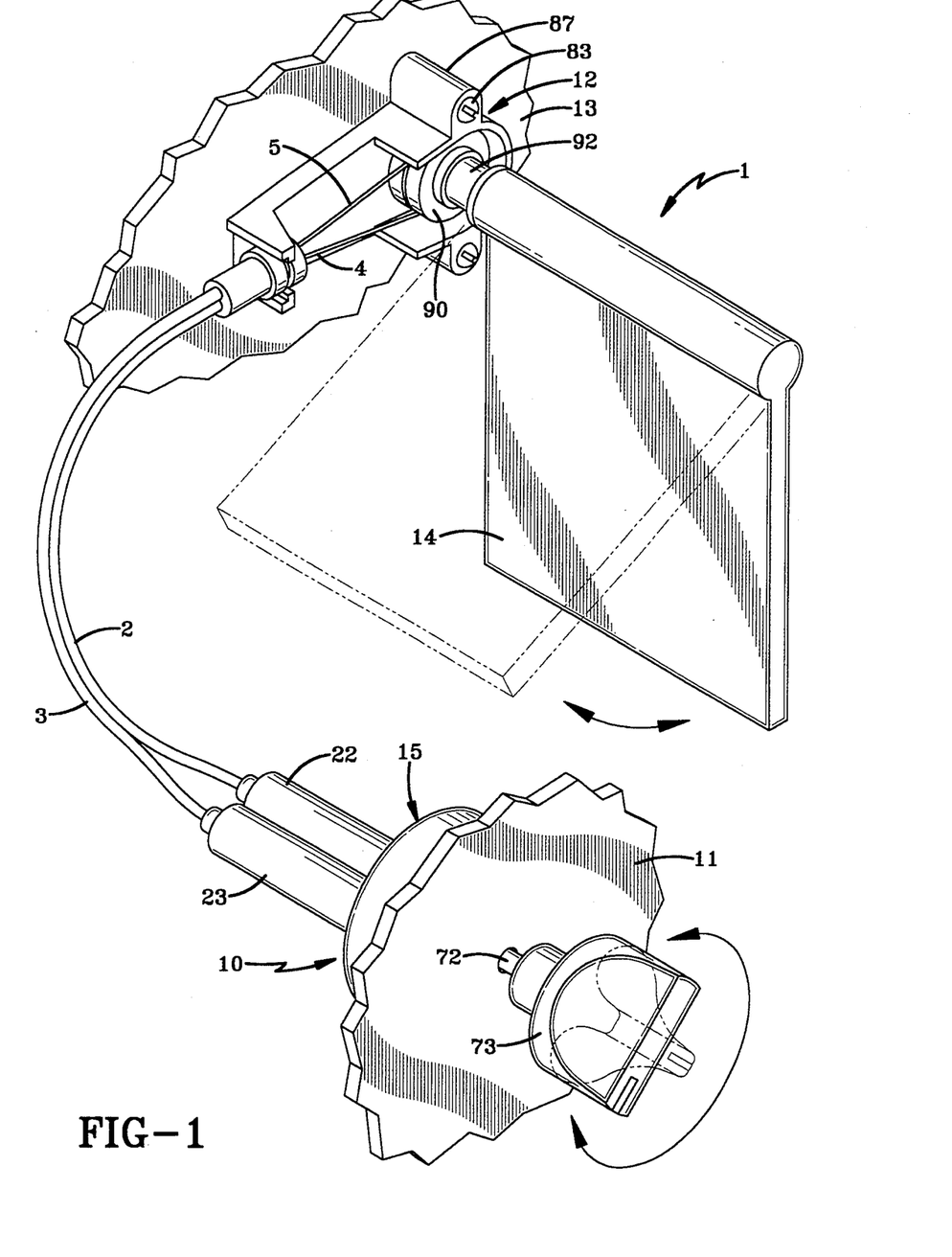
FIG. 1 is a fragmentary diagrammatic perspective view of a usual vehicle control knob and associated bulkhead door operatively connected by a cable, with the knob and bulkhead door shown in a first position in solid lines, and in a second position in dot-dash lines.

A first embodiment of the improved rotary controlled assembly is indicated generally at 1, and is shown in FIG. 1 in a usual operating position. Flexible conduits 2 and 3 are cylindrically shaped, with each having a cable 4 and 5 respectively, slidably mounted therein. Cables 4 and 5 extend between a dash assembly indicated generally at 10, shown in FIG. 1 mounted in a usual vehicle dashboard 11, and a motion receiver assembly, indicated generally at 12, which is mounted on a usual bulkhead 13 of a vehicle. Cables 4 and 5 have respective first ends 6 and 7 (FIG. 2) adjacent the motion receiver assembly 12, and respective second ends 37 and 38 adjacent dash assembly 10. A bulkhead door 14 extends outwardly from bulkhead 13, and is movably mounted on receiver assembly 12. Door 14 is movably pivotally mounted adjacent an opening (not shown) in the bulkhead 13 for opening and closing the opening upon manual adjustment via dash assembly 10 to regulate the temperature within the passenger compartment of the vehicle. The extreme positions of the door are shown in FIG. 1 wherein one position is shown in solid lines, and the second is shown in dot-dash lines as will be described in detail hereinbelow.

As such, the four main components of the rotary controlled motion transmission assembly are cables 4 and 5, dash assembly 10 and receiver assembly 12.

Figure 2:
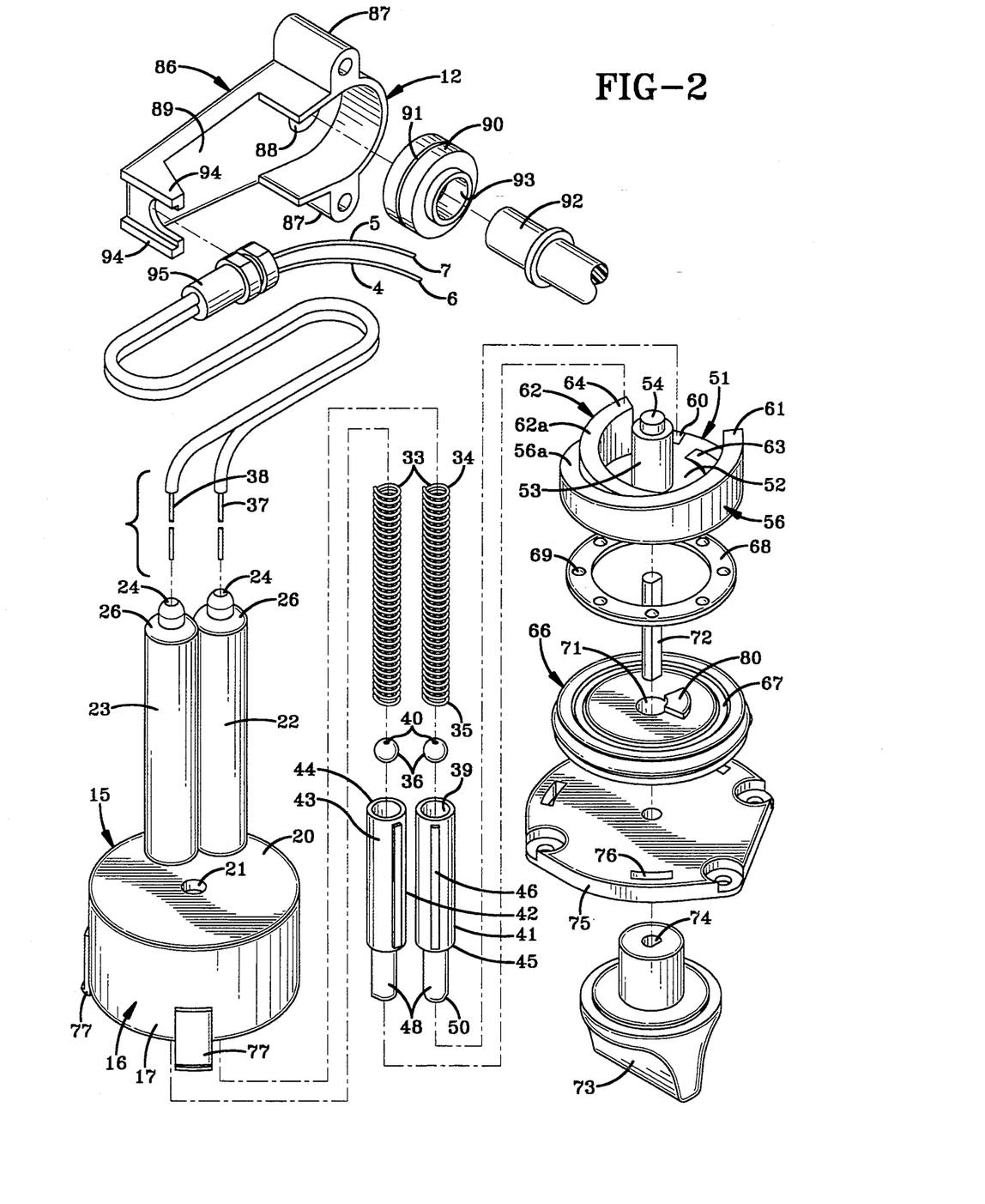
FIG. 2 is an exploded perspective view of the rotary controlled assembly shown in FIG. 1.

Referring to FIG. 2, there are shown the various parts of the dash assembly 10 in exploded condition, which include a housing 15 having a generally cylindrically shaped body 16 with a sidewall 17 terminating at one end at an endwall 20. Housing 15 preferably is molded out of high strength plastic. An aperture 21 extends through endwall 20, the purpose for which will be described hereinbelow.

Figure 3:
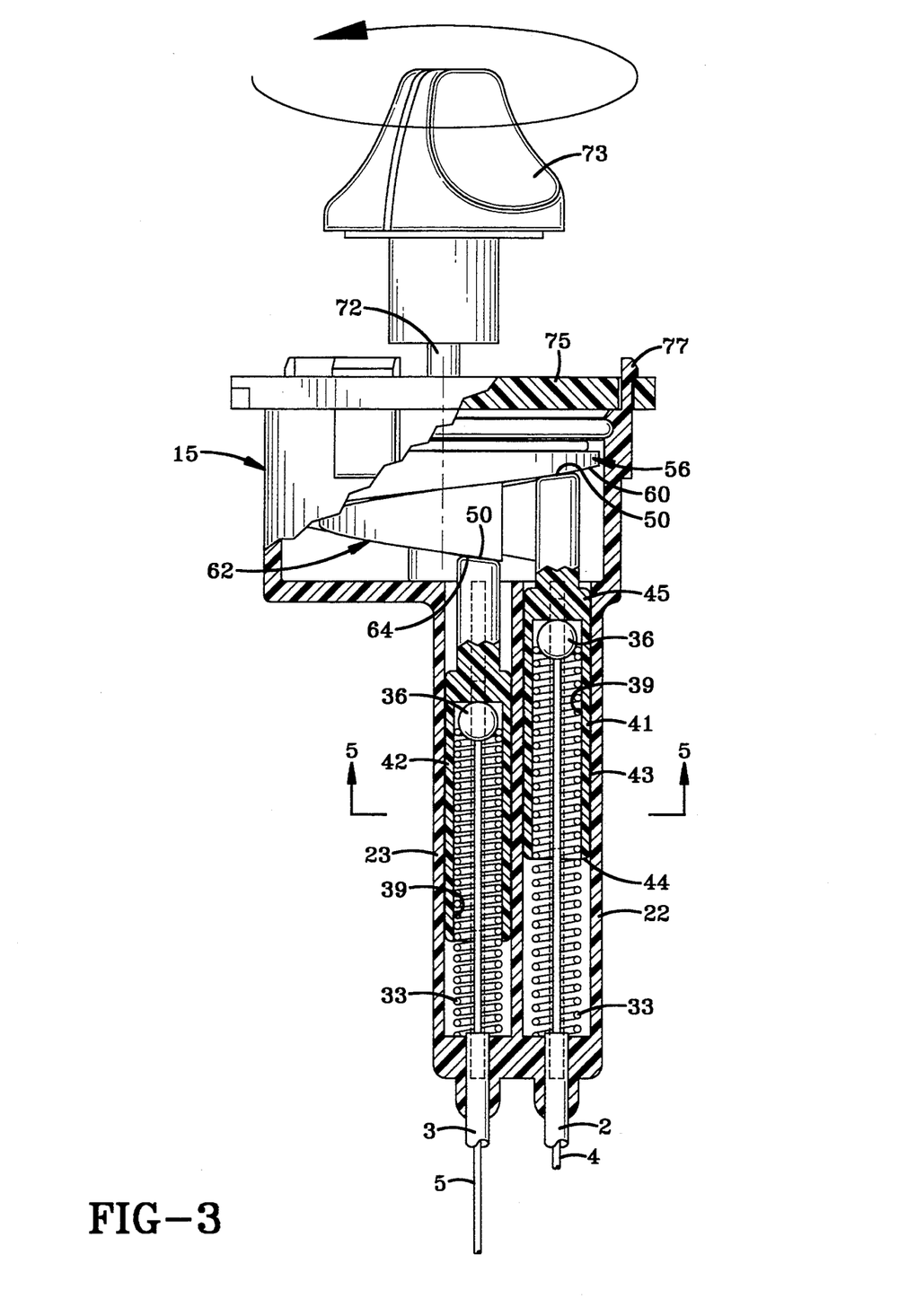
FIG. 3 is a side elevational view with portions cutaway and in section, of the control portion of the invention with the control knob in a first position.
Figure 4:
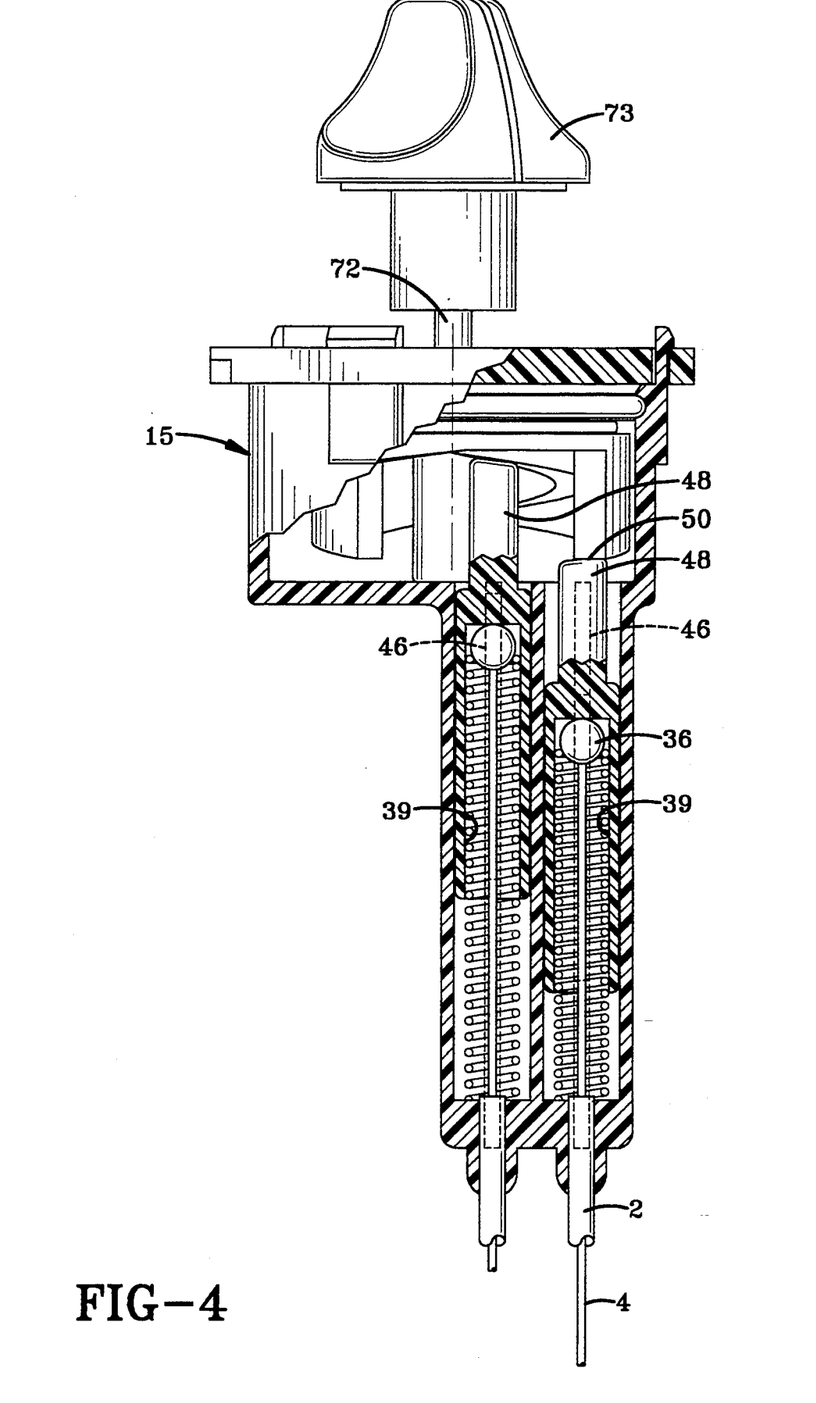
FIG. 4 is a side elevational view similar to FIG. 3 with the control knob in a second position.
Figure 5:
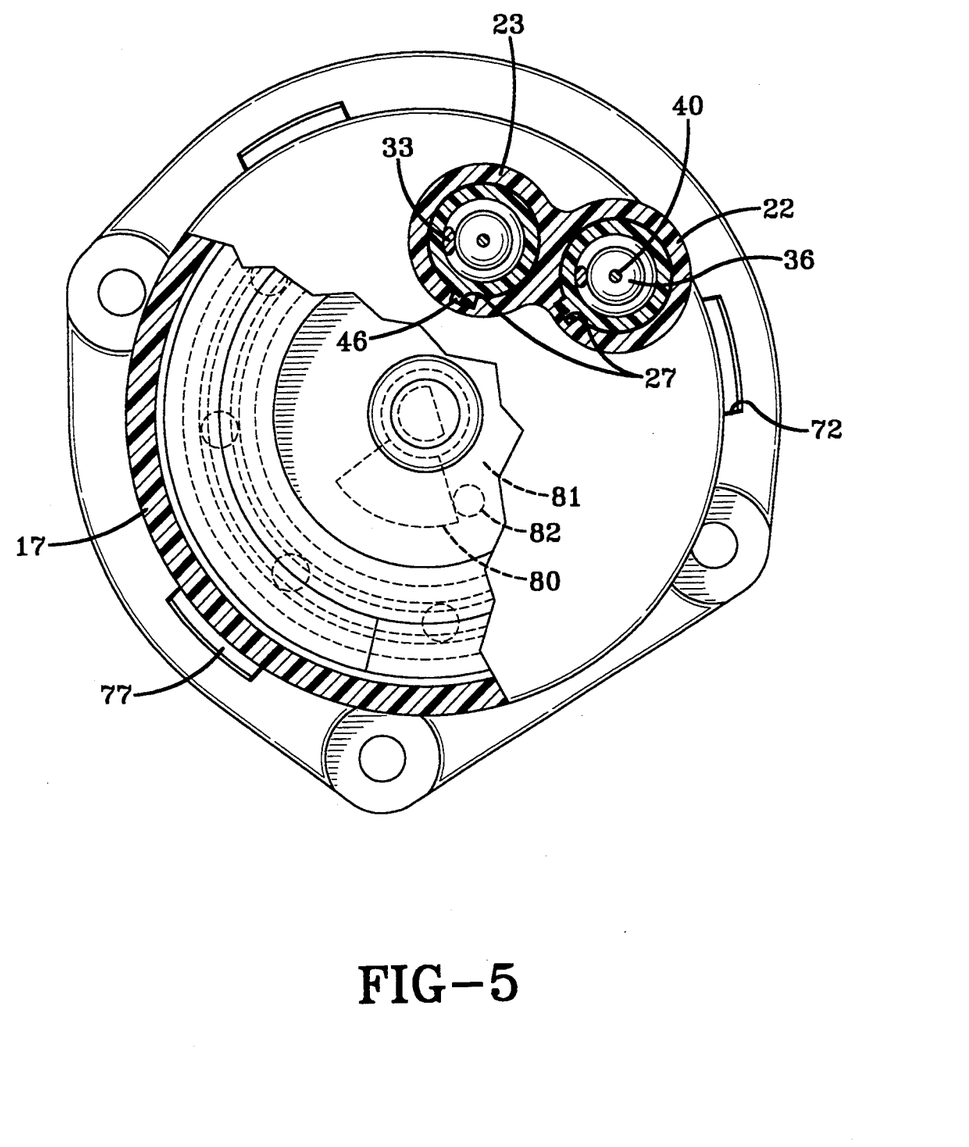
FIG. 5 is an enlarged sectional view taken along line 5—5 of FIG. 3, with portions cutaway and in section.

A pair of cylindrical sleeves 22 and 23 are molded integrally with end wall 20 and extend outwardly therefrom. Each sleeve 22 and 23 terminates at a free end which has an endwall 26 integrally formed therewith and has an opening 24 extending therethrough. Each sleeve 22 and 23 has a keyway 27 in an interior surface thereof, as shown in FIG. 5. A helical compression coil spring 33, having a first end 34 and second end 35, is placed in each sleeve 22 and 23, such that first end 34 of each spring 33 abuts the interior of endwall 26 (FIGS. 3 and 4). Springs 33 have an outer diameter slightly smaller than the diameter of the hollow interior of sleeves 22 and 23.

A spherical connector 36 (FIGS. 3 and 4) has a diameter larger than the inner diameter of helical spring 33, and smaller than the bore of sleeves 22 and 23, such that when connector 36 is placed in the sleeves, it will be supported by spring 33 with a portion of connector 36 extending into the interior of the spring. Cables 4 and 5 extend through openings 24 in endwalls 26 and through the center of springs 33 until ends 37 thereof contact spherical connectors 36. Cable ends 37 are secured in a hole 40 in each connector 36 to retain the cable end therein and to maintain the cable in the center of the spring.

A pair of plungers 41 and 42 are slidably mounted within sleeve 22 and 23, respectively. The plungers are similar and therefore only plunger 41 is described in detail, with similar numerals referring to similar parts on plunger 42. Plunger 41 is cylindrical and has an inner wall 39 (FIGS. 3 and 4), an outer wall 43 and endwalls 44 and 45. Plunger 41 is complementarily shaped to the interior surface of sleeve 22 such that the plunger slidably engages the interior of sleeve 22. A key 46 (FIGS. 2 and 5) is integrally molded with plunger 41 and is complementarily sized to fit into keyway 27 to prevent rotation of the plunger as it slides within sleeve 22. Inner wall 39 has a diameter sufficient to accept both spherical connector 36 and spring 33 when assembled into sleeve 22. Connector 36 abuts the interior surface of endwall 45 such that connector 36 is interposed between spring 33 and wall 45. A dowel 48 extends from endwall 45 in coaxial alignment with plunger 41 such that when installed into sleeve 22, dowel 48 extends into housing 15 as shown in FIGS. 3 and 4. The free end of dowel 48 is chamfered to provide a camming surface 50.

In accordance with one of the main features of the present invention, a cam plate indicated generally at 51, is rotatably mounted within housing 15. Cam plate 51 includes a flat circular plate 52 (FIGS. 2–5) with a dowel 53 extending outwardly from its axial center. A boss 54 extends from the free end of dowel 53 and is complementarily sized to fit within aperture 21 in endwall 20 of housing 15. The operative association of aperture 21 and boss 54 provides a point of rotation for cam plate 51, as well as means to assure that cam plate 51 remains axially aligned with the center axis of housing 15.

A first or outer ramp 56 extends outwardly from and extends around a portion of the perimeter of plate 52, having a flat ramp surface 56a terminating in a low end 60 and a high end 61 (FIG. 2). A second or inner ramp 62 is formed on flat plate 52 and extends outwardly therefrom and is concentric with a portion of ramp 56, and also has a flat ramp surface 62a which terminates in a low end 63 (FIG. 4) and high end 64. Ramps 56 and 62 are positioned such that the high end of either ramp lies along the same radius line as the low end of the other ramp.

When installed, each ramp surface 56a and 62a contacts a respective cam surface 50 of plunger dowels 48 which extend into housing 15. In this manner when cam plate 51 is rotated, each dowel cam surface 50 will slidably engage and move along a respective ramp surface 56a or 62a. Moreover, as each dowel cam engages a corresponding ramp, the associated plunger will move axially within its respective sleeve as will be described in more detail hereinbelow.

An annular plate 66 is complementarily sized to fit within housing 15 (FIG. 2) and has an inner surface which is found with an annular groove 67 therein to provide a track in which balls 69 of a thrust bearing 68 will ride. An aperture 71 extends through the center of plate 66 which is fitted to allow a keyed control rod 72 to pass therethrough. Rod 72 is secured to dowel 53 of cam plate 51 by any convenient attachment means, such as by forming rod 72 with at least one flat side which matches with a corresponding flat side formed in a hollow central opening of dowel 53. A control knob 73 has a flat sided center aperture 74 which accepts control rod 72 such that the rotation of the control knob 73 will rotate rod 72 and cam plate 51. Bearing balls 69 ride in annular groove 65 (FIGS. 2 and 5) formed in cam plate 51 to rotatably mount cam plate 51 with respect to plate 66.

A plate 75 (FIG. 2) mounts assembly 10 into dashboard 11 of a usual vehicle. Plate 75 provides mounting recesses 76 which accepts tangs 77 formed on housing 15 in a bayonet type locking arrangement. As should be apparent to one skilled in the art, mounting plate 75 could be of any convenient shape or size without departing from the spirit of the present invention.

At best seen in FIGS. 2 and 5, a rotation stop pad 80 extends outwardly from plate 66 toward cam plate 51 and through the center opening of thrust bearing 68 terminating near inner surface 81 of cam plate 51. A circular protrusion 82 extends outwardly from cam plate surface 81 and engages pad 80 to prevent the full rotation of the cam plate. Specifically, protrusion 82 extends outwardly such that it abuts the edge of stop pad 80 to prevent further rotation of the cam plate. Moreover, when cam plate 51 is rotated to the opposite extreme position, the protrusion will stop further rotation of the plate when it contacts the opposite side of stop pad 80.

Referring again to FIG. 2, receiver assembly 12 has an open housing 86 with lugs 87 extending outwardly therefrom for passing a fastener therethrough and mounting assembly 12 to the bulkhead of a vehicle. An aperture 88 is formed in a rear wall 89 of housing 86 for accepting a boss (not shown) of a pulley 90. Pulley 90 rotates on the boss which is snap-fittedly engaged with the rear wall 89 of housing 86. An annular groove 91 extends circumferentially around the pulley of a diameter sufficient to accept cables 4 and 5. A shaft 92 is adapted to frictionally fit into a central bore 93 of pulley 90. Shaft 92 then operatively engages door 14 to affect the pivotal movement of the door for regulating the air flow into the passenger compartment. A pair of spaced fingers 94 extend outwardly from rear wall 89 of housing 86 for gripping a cable grip 95 which is attached to the ends of flexible conduits 2 and 3 (FIG. 2).

Ends 37 and 38 of cables 4 and 5 pass through a respective aperture 24 in the ends of sleeves 22 and 23, and through a respective spring 33, and into a respective aperture 40 of a spherical connector 36. The second ends 6 and 7 of cables 4 and 5 are placed in opposing sides of annular groove 91 of pulley 90 and joined together by any convenient joining means. Thus cables 4 and 5 form a single length of cable having one end extending through sleeve 22 and connected to spherical connector 36, extending through conduit 2 and traveling around pulley 90, and then through conduit 3, and sleeve 23 and terminating at second connector 36.

Turning to the installation and operation of the rotary controlled transmission assembly, the installation is best seen in FIG. 1, wherein receiver assembly 12 is mounted onto bulkhead 13 by screws 83 passing through lugs 87. If desired, assembly 12 can be mounted on bulkhead 13 by a snap-fit connection or other type of mounting attachment. Flexible conduits 2 and 3 are then weaved along a circuitous path under the dash of the vehicle to dash assembly 10 which is mounted to dashboard 11 via mounting plate 75 (FIG. 2). Thereafter, knob 73 is placed on the keyed control rod 72 which projects through the dashboard to effect the operation of the assembly. Once installed, shaft 92 of door 14 is placed into bore 93 of pulley 90, such that door 14 is aligned with an opening (not shown) in bulkhead 13 to control the environment within the passenger compartment.

The operation of assembly 1 is best seen in FIGS. 2, 3 and 4. Referring specifically to FIGS. 2 and 3, cam surface 50 of plunger 41 is resting against lower end 60 of outer ramp 56, and cam surface 50 of plunger 42 is resting against high end 64 of inner ramp 62. Plungers 41 and 42 are held in position against respective ramps 56 and 62 via springs 33. The relative positioning of plungers 41 and 42 places door 14 (FIG. 1) in a first position.

As knob 73 is rotated in the counterclockwise direction of arrow A as shown on FIG. 3, control rod 72 will also be rotated due to the keyed relation between knob 73 and rod 72 described above, and in turn will rotate cam plate 51. Once cam plate 51 begins rotating in the direction of arrow A, cam surface 50 of plunger 41 will cam up along ramp surface 56a causing plunger 41 to move axially within sleeve 23 compressing spring 33. Such axial movement will move spherical connector 36, and correspondingly will move cable 4 which is attached to connector 36, through flexible conduit 2.

Similarly, once cam plate 51 begins to rotate in the direction of arrow A, cam surface 50 of plunger 41 will cam down ramp 56 from its low end 60 toward its high end 61, forcing plunger 41 and spherical connector 36 into sleeve 22, and consequently attached cable 4, from the position of FIG. 3 to that of FIG. 4. Thus, rotation of cam plate 51 causes plungers 41 and 42 to move in opposing directions, thereby pulling on one of the cables while pushing on the other cable. The result of such rotation is seen in FIG. 4 where knob 73 has been rotated to a second position which has moved plungers 41 and 42, as well as cables 4 and 5, from their previous position of FIG. 3.

As plunger 42 cams down ramp 62, cable 5 will be relaxed, and will move through conduit 3 applying a counterclockwise rotational force on pulley 90. Conversely, as plunger 41 cams up ramp 56, cable 4 will be pushed through conduit 2, applying a counterclockwise rotation force on pulley 90. Such rotational forces will rotate pulley 90 and connected shaft 92 to move door 14 to a desired position.

The rotation of knob 73 is limited by the engagement of rotation stop pad 80 with protrusion 82 shown in FIG. 5. The width of stop pad 80 may be varied depending on the total percentage of circumferential rotational freedom desired. If only 270 degrees of knob rotation is desired, then pad 80 may be made to extend over the remaining 90 degree arc. Similarly, if 300 degrees of knob rotation is desired, then pad 80 would only extend over of the remaining 60 degree arc. In any event, the interaction of the stop pad 80 and protrusion 82 prevents plungers 41 and 42 from sliding off the ramp surfaces and onto flat surface 52 of the cam plate.

Springs 33 assure that a generally constant tension is applied to cables 4 and 5, as well as ensuring engagement of plunger surfaces 50 on ramp surfaces 56 and 62. Springs 33 thus provide generally equal and opposite forces acting on the oppositely oriented ramp surfaces via the ramps surfaces interaction with respective cam surfaces 50, such that neither the force on ramp 56, nor the force on ramp 62 is substantially greater than the other. Although the forces are slightly different as spring loads increase with further compression, the difference is small enough to prevent inadvertent rotation while the car is in motion, and thus creates a more stable transmission assembly.

Referring next to FIG. 5, the interaction of keys 46 and keyways 30 prevents the rotation of the plungers in the respective sleeves. If the plungers were not keyed, and rotation occurred, then the angular relation between respective cam surfaces 50 and the respective ramp 56 or 62, would be altered possibly causing the plunger to jam inside the sleeve. Moreover, the continuous pressure contact between plunger cam surfaces 50 and ramps 56 and 62 is important, since it reduces material creep at higher temperatures and also assures that the plungers remain engaged with their respective ramp.

A second embodiment of the invention is shown in FIGS. 6–9 and is indicated generally at 99. In certain vehicles the area behind the dashboard is too narrow and will not permit sleeves 22 and 23 of assembly 1 to extend outwardly from dashboard 11, or alternatively other equipment must be installed behind the dashboard where housing 15 is located. To alleviate this problem, the second embodiment provides an arrangement similar to that of the first embodiment, with the exception that the sleeves extend radially outwardly from sidewall 17 of the dash assembly housing instead of axially as in embodiment 1.

Figure 6:
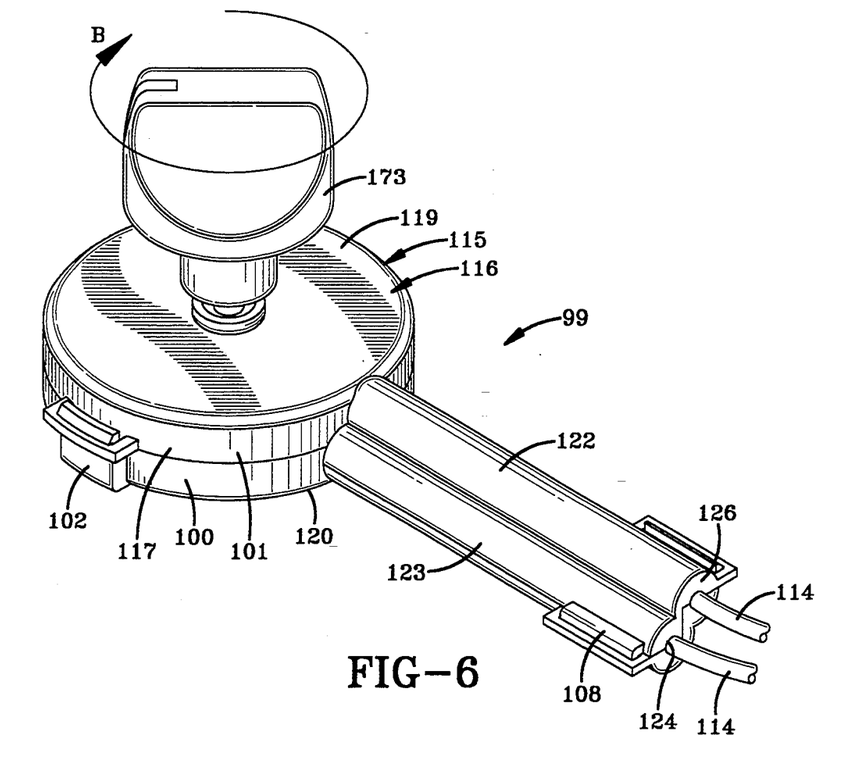
FIG. 6 is a perspective view of a second embodiment of the present invention.

Referring to FIG. 6, a housing 115 is formed of two molded parts 100 and 101 which are mated and releasably joined together by snap-fit connectors 102. Housing 115 preferably is molded of a high strength plastic material and has a cylindrically shaped body 116 with a cylindrical sidewall 117 and a pair of spaced endwalls 119 and 120. Apertures 104 and 105 are formed in endwalls 119 and 120 (FIG. 7), and are surrounded by bosses 106 and 107, respectively. Cylindrical sleeves 122 and 123 extend radially outwardly from sidewall 117 in a slightly offset relationship as shown in FIG. 6, and are integrally formed therewith, and are snap-fitted together by connectors 108. Each sleeve 122 and 123 has an end opening 124 extending through a respective endwall 126.

A keyway (not shown) is formed on an inner surface of each sleeve 122 and 123, and is similar to keyway 27 of assembly 1 for slidably receiving therein keys 110 (FIGS. 8 and 9) formed on the outer surface of a pair of similar plungers 141 and 142, which are similar to plungers 41 and 42 of assembly 1. A pair of control cables 112 and 113 extend out of sleeves 122 and 123 respectively, with each cable being covered by a conduit 114. The inner cable ends are connected to spherical connectors or balls 134.

A compression coil spring 133, similar to spring 33, is placed in each sleeve 122 and 123, such that an end 135 of each spring 133 abuts a respective endwall 126. As is evident from the above description, the assembly of the plungers, springs and cables into sleeves 122 and 123 are similar to the assembly of like parts into sleeves 22 and 23 of the first embodiment if assembly 1.

Figure 7:
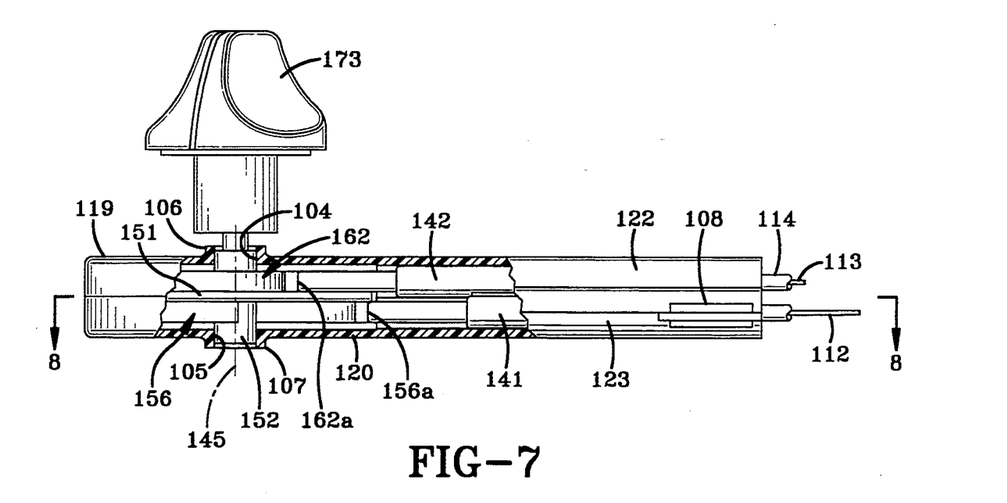
FIG. 7 is a side elevational view of the second embodiment as shown in FIG. 6, with portions cutaway and in section.
Figure 8:
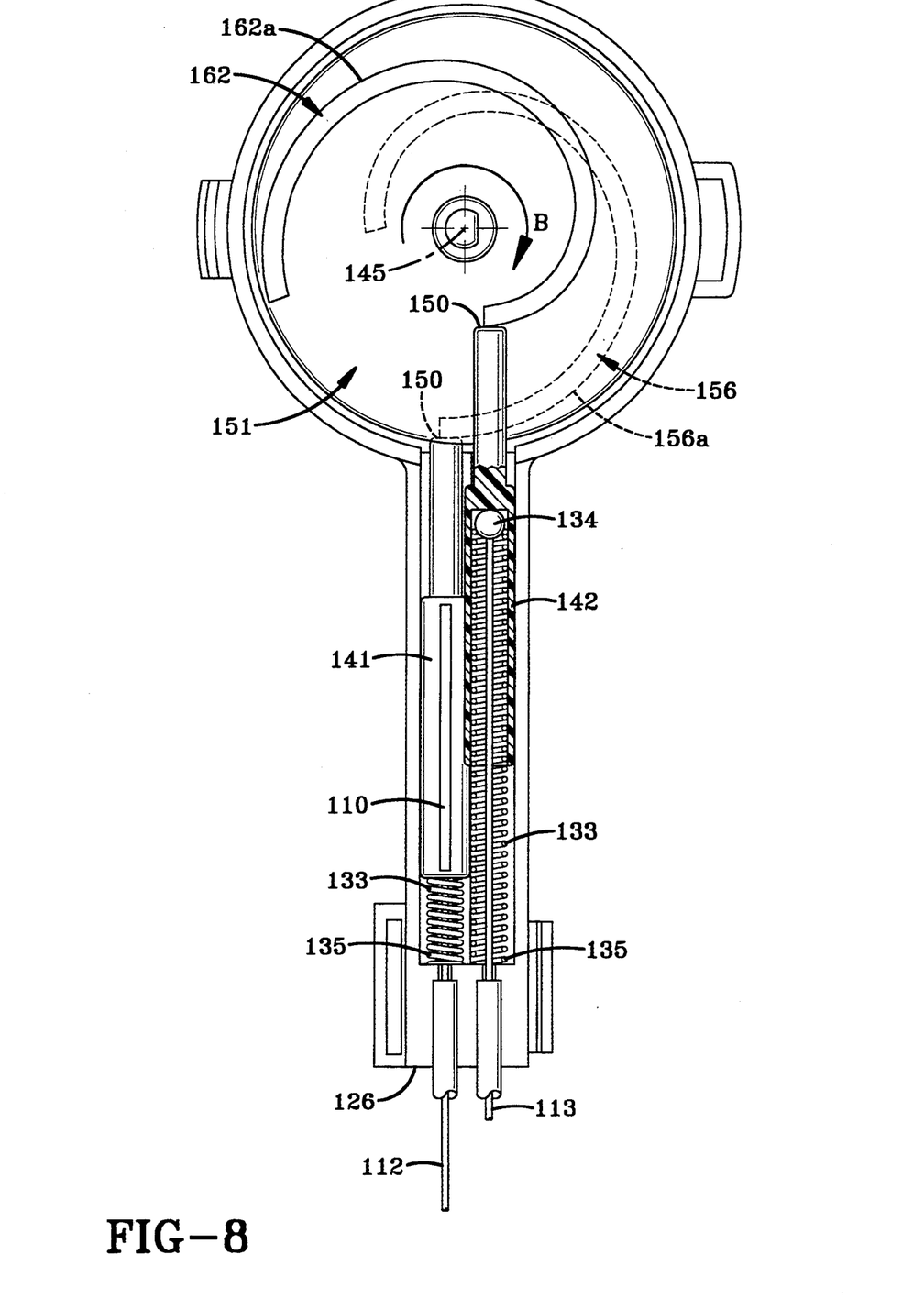
FIG. 8 is a top plan view of the second embodiment of the present invention positioned with the knob in a first position, with the top removed, and with portions of the exposed mechanism in cutaway and in section.
Figure 9:
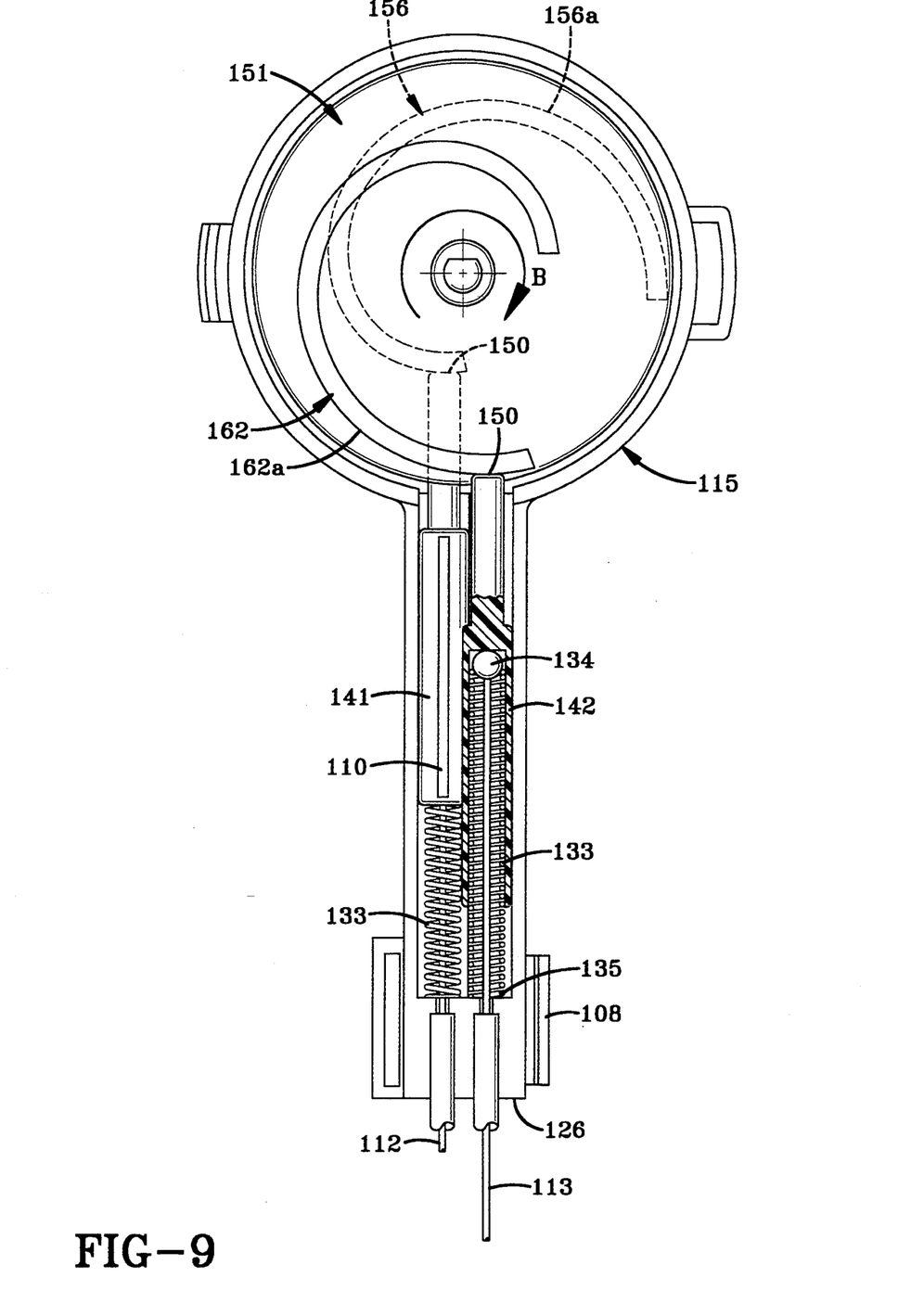
FIG. 9 is a top plan view similar to FIG. 8 with the control knob shown in a second position.

A cam plate 151 generally similar to cam plate 51, is rotatably mounted within housing 115 by a cylindrical hub 152 which is rotatably mounted within the bosses 106 and 107 (FIG. 7). The design of cam plate 151 differs somewhat from that of cam plate 51, in that ramps 156 and 162 are each formed as a partial helix with an outwardly increasing radius of curvature, which radius of curvature generally increases at a constant rate of change, as shown in FIGS. 8 and 9. Helically shaped ramps 156 and 162 share a common mean diameter, and are disposed axially aligned with one another with respect to the central axis 145 of cylindrical housing 115, and are located on opposite surfaces of plate 51. Thus ramp 156 is located adjacent endwall 120 and ramp 162 is located adjacent endwall 119. Each end surface 150 of staggered plungers 141 and 142 engages a respective ramp surface 156a and 162a as knob 173 is turned, in a similar manner as in the first embodiment. However, in the second embodiment of assembly 99, plunger surfaces 150 engage the side surfaces of the ramps instead of the top surfaces as in the first embodiment.

The operation of the second embodiment is generally similar to the operation of the first embodiment. As knob 173 is rotated in the direction of arrow B, from the position shown in FIG. 8, to that of FIG. 9, plunger 142 will be moved axially into sleeve 122 thereby effecting the axial movement of the associated cable 113. Similarly, plunger 141 will be moved further into housing 115 which in turn, will move attached cable 112 in an opposite direction to that of cable 113. The movement of the cables will operate the receiver assembly in the same way as was accomplished in the first embodiment, namely, will rotate pulley 90 and attached door 14. FIG. 8 represents a first position of the cam plate and FIG. 9 depicts the orientation of the assembly after the cam plate has been rotated throughout its full extent of rotational movement.

As should be apparent to one skilled in the art, the radius of curvature of ramps 156 and 162, could be increased at a non-constant rate with the effect of increasing the rate of door movement through the center of the door's travel, and to slow the door's movement near the open and closed positions where the door movement has the most affect on air flow into the passenger compartment. Similarly, the height of the ramps 56 and 62 in the first embodiment may be altered to increase or decrease the movement of the door for each incremental adjustment of the knob to create a more uniform incremental change to effective air flow for each incremental knob turn. In essence, by varying the rate of change of the radius of curvature of ramps 158 and 162, or the rate of change of the height of ramps 56 and 62, the effective air flow into the passenger compartment can be made constant for each incremental turn of the control knob.

Accordingly, the improved rotary controlled motion transmission device is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rotary controlled motion transmission assembly is constructed and used, the characteristics of the construction, and the advantageous, new and useful results obtained; the new and useful structures, devices, elements, arrangements, parts and combinations, are set forth in the appended claims.

I claim:

1. A rotary controlled motion transmission assembly comprising:

a housing;

rotary control means associated with said housing for imputing a rotary force;

force transfer means operatively associated with said rotary control means for accepting the input of the rotary force from the rotary control means and for transferring the rotary force into linear motion, said force transfer means comprising a cam plate having first and second ramps and first and second plungers, said plungers opposing a respective one of said ramps such that the rotation of the cam plate linearly moves the plungers, said ramps being positioned such that when the cam plate is rotated by the rotary control means, the first ramp linearly moves a corresponding plunger in a first direction, and the second ramp linearly moves a corresponding plunger in a direction opposite to the first direction;

receiver means for accepting the linear motion and creating rotary motion therefrom; and transmitting means extending from said housing to said receiver means for transmitting the linear motion of said force transfer means along a circuitous path to said receiver means.

2. A rotary controlled motion transmission assembly as defined in claim 1 wherein each of the ramps is annular; and in which the mean diameter of the first ramp is coaxial with the mean diameter of the second ramp.

3. A rotary controlled motion transmission assembly as defined in claim 2 wherein the ramps lie in concentric circles; and in which said ramps are positioned axially apart from one another.

4. A rotary controlled motion transmission assembly as defined in claim 1 further comprising spring means engaged with each of the plungers for biasing each of the plunger toward a respective one of the ramps.

5. A rotary controlled motion transmission assembly as defined in claim 4 wherein the transmitting means includes two cables, each cable traveling through a respective flexible conduit, with a first end of each cable being operatively connected to a respective one of said plungers; and in which a second end of each cable is operatively connected to said receiver means.

6. A rotary controlled motion transmission assembly as defined in claim 4 in which the force transfer means includes a housing and a pair of sleeves extending outwardly from said housing; and in which each of the plungers extends at least partially into a respective sleeve carried by the housing.

7. A rotary controlled motion transmission assembly as defined in claim 6 wherein each of the spring means is a compression coil spring; in which each of said cables extends through an aperture formed in an end wall of a respective sleeve and through a respective coil spring terminating at an end connector; and in which each of said end connectors is interposed between a respective coil spring and a respective plunger.

8. A rotary controlled motion transmission assembly as defined in claim 8 wherein the coil springs have similar spring constants such that a generally constant force is applied to each of said plungers by said springs.

9. A rotary controlled motion transmission assembly as defined in claim 6 further comprising a keyway extending axially along an interior of each of said sleeves; and in which a key extends outwardly from each of said plungers and is operatively engaged in a respective one of the keyways to slidably non-rotatably mount each of the plungers within a respective sleeve.

10. A rotary controlled motion transmission assembly as defined in claim 6 in which the housing includes an end wall; and in which a thrust bearing is interposed between said housing endwall and the cam plate for rotatably mounting the cam plate within the housing.

11. A rotary controlled motion transmission assembly as defined in claim 1 further comprising limiting means for limiting the rotation of the rotary control means and cam plate.

12. A rotary controlled motion transmission assembly as defined in claim 12 wherein the limiting means comprises a stop pad extending from the housing toward the cam plate and a projection extending outwardly from said cam plate, such that said projection and said stop pad may be moved in and out of abutting engagement upon actuation of the rotary control means.

13. A rotary controlled motion transmission assembly as defined in claim 1 wherein the first and second ramps extend throughout an arcuate path less than 360 degrees.

14. A rotary controlled motion transmission assembly as defined in claim 6 wherein the sleeves extend radially outwardly from the housing with respect to the axis of rotation of the cam plate.

15. A rotary controlled motion transmission assembly as defined in claim 6 wherein sleeves extend axially outwardly from the housing with respect to the axis of rotation of the cam plate.

16. A rotary controlled motion transmission assembly as defined in claim 1 wherein the first and second ramps are located on opposite sides of the cam plate.

* * * * *